(12) United States Patent
Rose

(10) Patent No.: US 6,685,246 B1
(45) Date of Patent: Feb. 3, 2004

(54) DEVICES FOR REMOTE MANIPULATION OF ITEMS

(76) Inventor: Mack Rose, 4686 Eagle Cir. NW., North Canton, OH (US) 44270-7081

( * ) Notice: Subject to any disclaimer, the term of this patent is extended or adjusted under 35 U.S.C. 154(b) by 17 days.

(21) Appl. No.: 10/141,802

(22) Filed: May 8, 2002

(51) Int. Cl.$^7$ .............................. B25J 1/00; F24B 15/10
(52) U.S. Cl. ......................... 294/11; 294/50.9; 294/104
(58) Field of Search .............................. 294/8.5, 10, 11, 294/22, 23, 50.8, 50.9, 19.1, 103.1, 104, 118

(56) References Cited

U.S. PATENT DOCUMENTS

| | | | | |
|---|---|---|---|---|
| 1,322,537 A | * | 11/1919 | Cartwright | 294/50.9 |
| 1,718,398 A | * | 6/1929 | Zaeske | 294/19.1 |
| 1,814,216 A | * | 7/1931 | Hartwell | 294/50.9 |
| 1,846,968 A | * | 2/1932 | Kablanow | 294/19.1 |
| 2,167,599 A | * | 7/1939 | Yanits | 294/11 |
| 2,436,500 A | * | 2/1948 | Anderson | 294/50.8 |
| 2,610,886 A | * | 9/1952 | Parker | 294/50.9 |
| 2,749,088 A | * | 6/1956 | Jennens | 294/50.9 |
| 2,790,670 A | * | 4/1957 | Sheets | 294/50.9 |
| 3,990,146 A | * | 11/1976 | Asselta | 294/50.9 |
| 4,615,555 A | * | 10/1986 | Bateham | 294/19.1 |
| 6,457,756 B2 | * | 10/2002 | Pronesky et al. | 294/11 |

* cited by examiner

Primary Examiner—Dean J. Kramer
Assistant Examiner—Paul T. Chin
(74) Attorney, Agent, or Firm—Renner, Kenner, Greive, Bobak, Taylor & Weber

(57) ABSTRACT

A device for the remote manipulation of items comprising a support staff having a fore end and an aft end and including a handle at the aft end, a handle fulcrum proximate the aft end, a clamp fulcrum proximate the fore end, and a grip positioned between the handle fulcrum and the clamp fulcrum; a fork extending from the fore end of the support staff; a handle lever pivotally connected to the handle fulcrum and pivotal between an open position and a closed position; a clamp lever pivotally connected to the clamp fulcrum; a clamping tine extending from the clamp lever to be pivotal therewith between an open position and a closed position in relation to the fork; and a linkage extending between the handle lever and the clamp lever such that, when the handle lever is pivoted to the open position, the clamp lever is pivoted to place the clamping tine in the open position in relation to the fork, and, when the handle lever is pivoted to the closed position, the clamp lever is pivoted to place the clamping tine in the closed position in relation to the fork.

13 Claims, 4 Drawing Sheets

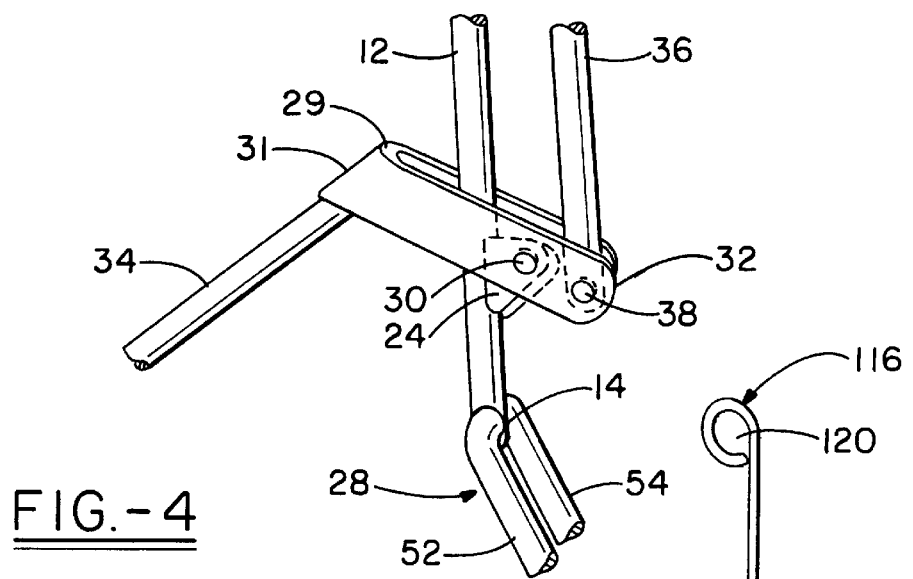
FIG.-4
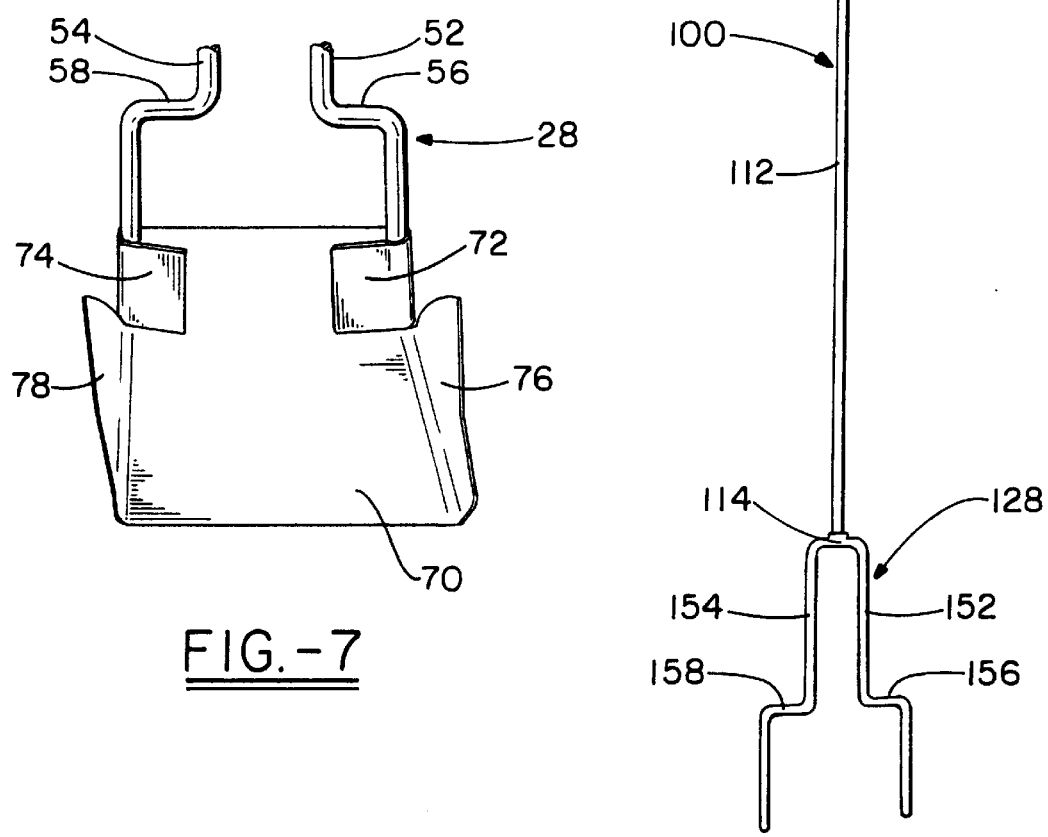
FIG.-7
FIG.-8

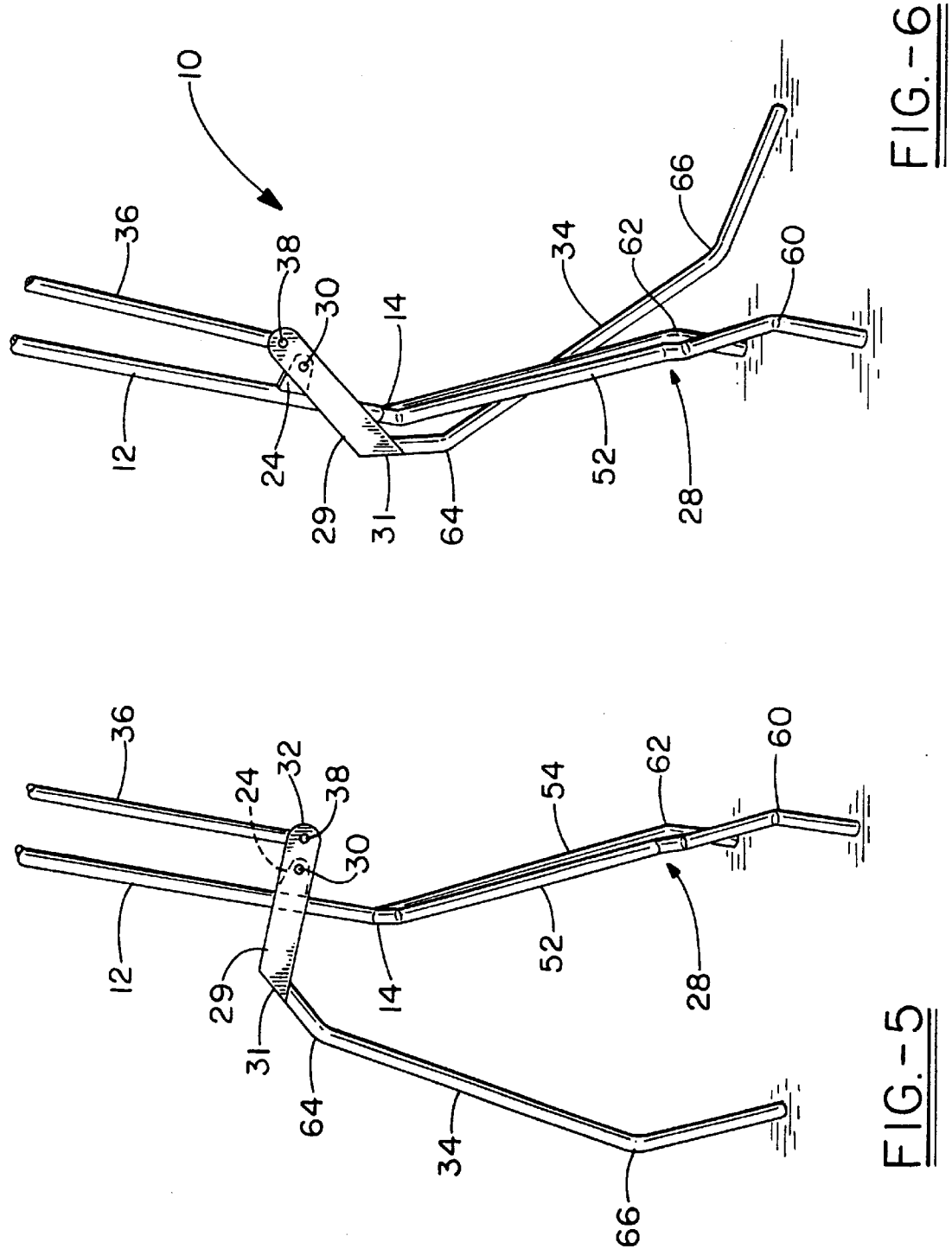

DEVICES FOR REMOTE MANIPULATION OF ITEMS

BACKGROUND OF THE INVENTION

The present invention generally relates to devices for the remote manipulation of items and, more particularly, relates to a device for grasping and manipulating hot or cold items or items that must be placed or manipulated in hot or cold environs.

When extremely hot or cold items must be moved from one place to another, it is desirable to handle those items from a remote position so as to avoid coming into direct contact with those items. This is also true when an item at non-extreme temperatures must be placed into an area that is maintained at an extremely high or low temperature. For example, while fire wood to be placed on a fire is not harmful to the touch, there is still an advantage to remotely manipulating the fire wood so that it may be placed at a precise location on a fire or in a kiln or stove, etc. To position a piece of fire wood on a fire with any precision, one must get very close to the fire, and risk being burned. Typically, to avoid being burned, fire wood is simply thrown on a fire from a location distant from the extreme temperature of the fire. Similarly, it is very difficult to manipulate a piece of fire wood that has already been placed on a fire, and devices for remotely manipulating the fire wood, such as pokers, must be employed.

The placement and repositioning of fire wood on a fire presents only one example of many instances in which extremely hot or cold items or items employed in extremely hot or cold applications must be manipulated. Other applications that come to mind include the manipulation of dry ice, foundry materials, pottery kiln materials, and the like. Indeed, there exists a multitude of applications in which the remote handling of items might be necessary.

The present invention serves to provide devices for remotely manipulating items so as to protect a worker from the extreme temperatures of either the items themselves or the devices in which the items must be placed or removed or manipulated. While it is understood that such devices currently exist in many different forms, the present invention provides many advantages over devices found in prior art, as will be seen in the disclosure to follow.

SUMMARY OF THE INVENTION

In general, the present invention provides a device for the remote manipulation of items comprising a support staff having a fore end and an aft end and including a handle at the aft end, a handle fulcrum proximate the aft end, a clamp fulcrum proximate the fore end, and a grip positioned between the handle fulcrum and the clamp fulcrum; a fork extending from the fore end of the support staff; a handle lever pivotally connected to the handle fulcrum and pivotal between an open position and a closed position; a clamp lever pivotally connected to the clamp fulcrum; a clamping tine extending from the clamp lever to be pivotal therewith between an open position and a closed position in relation to the fork; and a linkage extending between the handle lever and the clamp lever such that, when the handle lever is pivoted to the open position, the clamp lever is pivoted to place the clamping tine in the open position in relation to the fork, and, when the handle lever is pivoted to the closed position, the clamp lever is pivoted to place the clamping tine in the closed position in relation to the fork.

In particular embodiments of the present invention, the fork is staged to provide alternate widths between first and second tines thereof. The first and second tines are closer together proximate the fore end of the support staff and are staged further apart at a position distal from the fore end of the support staff. In this way, the fork, together with the clamping tine, is adapted to handle items of various dimensions, and may handle them in various positions. The device is configured such that the clamping tine is aligned between the first and second tines of the fork, and, in particularly preferred embodiments, the clamping tine and the first and second tines of the fork provide a tripod support that allows the device to be free standing in either the open or closed position.

In another embodiment of the present invention, a shovel attachment is provided that may be selectively placed on or removed from the fork of the device. The shovel attachment is particularly useful in fireplace, kiln, stove, or campfire applications. Particularly, the shovel attachment attaches to each of the individual tines of the fork of the device, and spans therebetween. Notably, the shovel attachment may be provided as part of yet another embodiment for the present invention, namely, a fireplace kit. A fireplace kit according to this invention would provide the device for remote manipulation of items, as above, the shovel attachment, and an additional straight poker, separate and distinct from the device and the shovel attachment, and providing a fork shaped like the fork of the device for the remote manipulation of items, such that the shovel attachment may be selectively placed on either the device or the straight poker.

Thus, the present invention also provides a kit for the remote manipulation of items comprising a clamping device including (a) a support staff having a fore end and an aft end and including a handle at the aft end, a handle fulcrum proximate the aft end, a clamp fulcrum proximate the fore end, and a grip positioned between the handle fulcrum and the clamp fulcrum; a fork extending from the fore end of the support staff; a handle lever pivotally connected to the handle fulcrum and pivotal between an open position and a closed position; a clamp lever pivotally connected to the clamp fulcrum; a clamping tine extending from the clamp lever to be pivotal therewith between an open position and a closed position in relation to the fork; and a linkage extending between the handle lever and the clamp lever such that, when the handle lever is pivoted to the open position, the clamp lever is pivoted to place the clamping tine in the open position in relation to the fork, and, when the handle lever is pivoted to the closed position, the clamp lever is pivoted to place the clamping tine in the closed position in relation to the fork; (b) a straight poker, separate from the clamping device, comprising a staff having a fork extending therefrom; and (c) a shovel attachment capable of being selectively received on the fork of the clamping device or the fork of the straight poker.

DESCRIPTION OF THE DRAWINGS

FIG. 4 is a perspective view of the clamping portion of the device, and provides more detail than the other FIGS. as to the clamping portion;

FIG. 5 provides a perspective view of the clamping tine and fork of the device, and displays how the device, in the open position, may be free standing;

FIG. 6 provides a perspective view of the clamping tine and fork of the device, and displays how the device, in the closed position, may be free standing;

FIG. 7 displays a shovel attachment that may be selectively placed on or removed from either the fork of the device of FIGS. 1–6 or the straight poker of FIG. 8; and FIG. 8 is a front plan of a straight poker that together with the device of FIGS. 1–6 and the shovel attachment of FIG. 7, forms a kit for the remote manipulation of items.

PREFERRED EMBODIMENT FOR CARRYING OUT THE INVENTION

Figure 1:
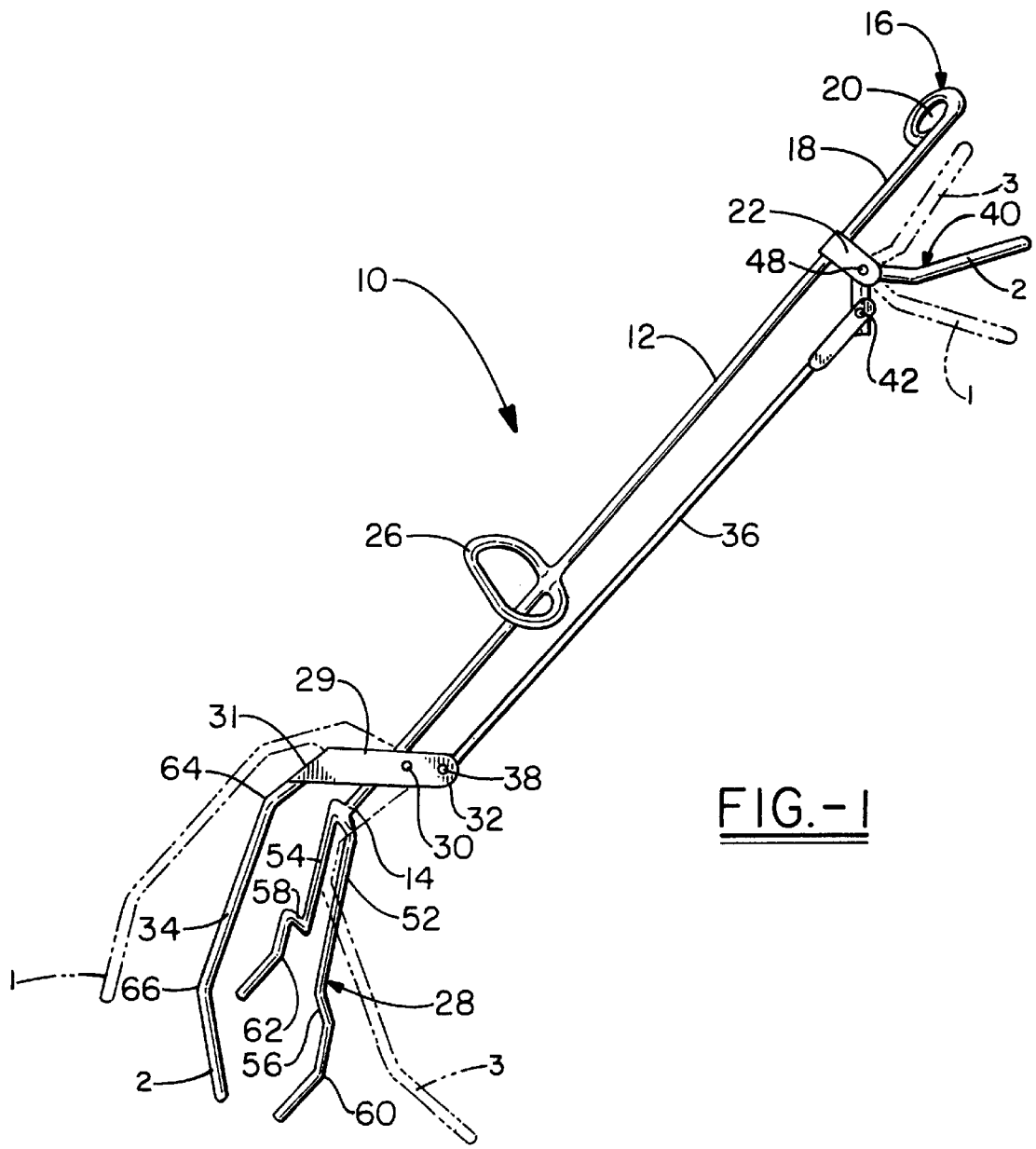
FIG. 1 is a perspective view of a device according to this invention for the remote manipulation of items, and depicts the device in an open position (at 1), a closed position (at 3), and an intermediate position therebetween (at 2)

With reference to FIG. 1, it can be seen that the device for the remote manipulation of items according to this invention is designated generally by the numeral 10. Device 10 includes a support staff 12 having a fore end 14 and an aft end 16. The extension of support staff 12 proximate aft end 16 is designated as handle 18 and, in the interest of providing a means for hanging device 10 near a site where it is to be employed, handle 18 is bent to provide a hanger loop 20. Perhaps best seen in FIG. 3, handle fulcrum 22 extends from support staff 12, and may be considered to define handle 18 as the portion of support staff 12 that extends from handle fulcrum 22 to aft end 16.

With reference to FIGS. 1 and 4, support staff 12 provides clamp fulcrum 24 proximate fore end 14, and grip 26 is provided on support staff 12, between handle fulcrum 22 and clamp fulcrum 24. Fork 28 extends from fore end 14, and serves to grasp items as will be explained in detail below. Preferably, fork 28 extends at an angle from fore end 14 of support staff 12, because such a configuration will allow device 10 to be used to grasp larger items than could be grasped if fork 28 extended along the same plane as support staff 12.

With continued reference to FIGS. 1 and 4, it is seen that clamp lever 29 is pivotally connected to clamp fulcrum 24 at pivot pin 30. Clamp lever 29 provides tine end 31 and linkage end 32, and is pivotally attached to clamp fulcrum 24 between these opposed ends. Clamping tine 34 extends from tine end 31 of clamp lever 29 so as to pivot with clamp lever 29 about clamp fulcrum 24 at pivot pin 30. Notably, clamping tine 34 is preferably aligned between fork 28.

Linkage 36 attaches between clamp lever 29 and handle lever 40. Particularly, linkage 36 attaches to clamp lever 29 at pivot pin 38, which is provided proximate linkage end 32, and attaches to handle lever 40 at pivot pin 42.

Figures 2, 3:
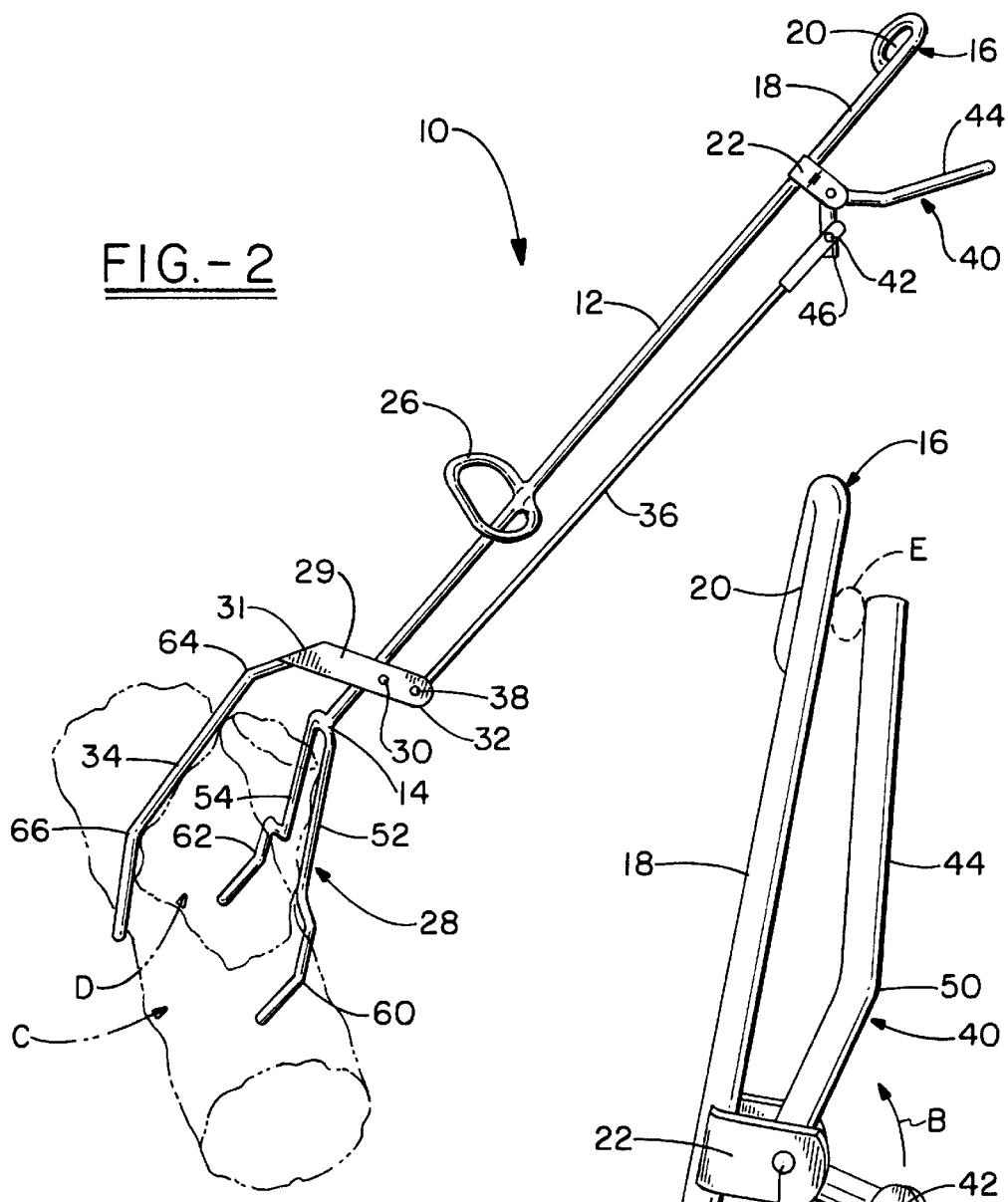
FIG. 2 is a perspective view of the device, and depicts how the device might be employed to manipulate items of different dimensions.
FIG. 3 is a perspective view of the handle portion of the device, and provides more detail than the other FIGS. as to handle portion.

With particular reference to FIG. 3, it can be seen that handle lever 40 is generally L-shaped, with major extension 44 and minor extension 46 meeting at a juncture that is pivotally attached to handle fulcrum 22 at pivot pin 48. It will be appreciated that handle lever 40 may be rotated about pivot pin 48 in either the direction of arrow A or arrow B. Particularly, handle lever 40 may be pivoted between open and closed positions, as represented in FIG. 1 at the positions identified by the numerals 1, 2, and 3. The major components of device 10 are shown in the non-phantom position of position 2, while the phantom positions, position 1 and position 3, help to show how the position of handle lever 40 relates to the positioning of clamping tine 34. When handle lever 40 is rotated in the direction of arrow A, as shown at phantom position 1, minor extension 46 of handle lever 40 urges linkage 36 downward to push on linkage end 32 of clamp lever 29. This movement forces clamp lever 29 to pivot about clamp fulcrum 24, thereby raising tine end 31 and clamping tine 34 to the position shown in phantom position 1. Thus, distance is provided between fork 28 and clamping tine 34 so that an item could be place therebetween and grasped by pivoting handle lever 40 in the direction of arrow B of FIG. 3 (i.e., towards the closed position).

Typically, a person employing device 10 would grab grip 26 in one hand and handle 18 in the other, and would urge handle lever 40 in the direction of arrow A (i.e., towards the open position) with his or her fingers. Fork 28 and clamping tine 34 would then be distanced from each other such that, by manipulating the device at handle 18 and grip 26, the user could position an item between fork 28 and clamping tine 34. Once in position, the item could be grasped by pulling major extension 44 of handle lever 40 toward handle 18. To help ensure that handle lever 40, particularly major extension 44 thereof, does not become too distant from handle 18, such that squeezing major extension 44 and handle 18 together in the direction of arrow B becomes difficult, bend 50 is preferably provided in major extension 44. As seen in FIG. 3, this places major extension 44 in closer proximity to handle 18 making it easier to grasp both of these elements to clamp fork 28 and clamping tine 34 onto an item.

It has already been mentioned that fork 28 extends at an angle from fore end 14 of support staff 12. In other preferred embodiments of this invention, fork 28 provides staged tines 52, 54, which increase in their distance of separation at steps 56, 58, respectively. With particular reference to FIG. 2, it can be seen how this staged design of fork 28 allows objects of different dimensions to be carried in different ways, thereby increasing the functionality of device 10. In phantom in FIG. 2, two different pieces of fire wood are shown as being grasped between fork 28 and tine 34. Notably, the larger piece of fire wood identified at the letter C rests between the wider portion of fork 28 and tine 34, while the smaller, odd shaped piece of fire wood identified by the letter D is grasped between the narrower portion of fork 28 and tine 34. Tines 52, 54 of fork 28 are also bent, as at bends 60, 62 respectively, to extend toward tine 34 to help ensure that items grasped by device 10 are securely held. Bends 60, 62 in tines 52, 54 preferably work in conjunction with bends provided in clamping tine 34, as will be discussed below.

With reference to FIGS. 2, 5 and 6, it can be seen that clamping tine 34 preferably includes bends, as at 64 and 66, in order to provide a number of utilitarian advantages. In FIG. 2, it can be seen that bend 64 aids in the clamping of items positioned such as item D inasmuch as it causes a length of clamping tine 34 to extend nearly parallel to fork 28, when clamping tine 34 is approximately midway between a fully open and a fully closed position. As seen with item D, this places a long length of clamping tine 34 directly against item D to help clamp item D between clamping tine 34 and fork 28. Similarly, as can be seen with item C in FIG. 2, bend 66, especially in conjunction with bends 60, 62 of fork 28, helps to hold items within the grasp of clamping tine 34 and fork 28.

Other utilitarian advantages provided by bends 60, 62 of fork 28 and bends 64, 66 of clamping tine 34 are depicted in FIGS. 5 and 6. Particularly, by means of these bends, device 10 may be made to be free standing in both the open and closed positions. In FIG. 5, the bottom portion of device 10 is shown in the open position, and it can be seen that bends 60, 62, 64, 66 provide a tripod support for device 10. FIG. 6 displays the bottom portion of device 10 in the closed position, and, by means of bends 60, 62, 64, 66, a tripod support is provided in the closed position as well. Thus, although hanger loop 20 is provided to provide a means for storing device 10, device 10 can also be made to be free standing in either the closed or open position.

It should be appreciated that, while certain preferred utilitarian advantages might be lost, the particular shape, including bends, that the clamping tine 34 and fork 28 are configured to have might be altered for specific item manipulation applications. For example, using the device 10 to control animals, perhaps for veterinary purposes, has been considered, and clamping tine 34 and fork 28 might be configured, for such an application, to be arc-shaped so as to come together, during clamping, in a more circular shape, to accommodate the body or neck of an animal.

Yet another utilitarian aspect of the present invention is shown in FIG. 3, at the letter E. The letter E identifies a generic object (shown in phantom) that is being clamped between handle 18 and major extension 44 of handle lever 40. Notably, while handle lever 40 is typically manipulated to open and close the distance between fork 28 and clamping tine 34, manual manipulation of the distance between fork 28 and clamping 34 will likewise open and close the distance between handle 18 and major extension 44 of handle lever 40. Thus, small items, such as that identified at E in FIG. 3, may be picked up by device 10 by reversing the orientation in which device 10 is typically used.

Realizing that device 10 may be employed in applications dealing with the combustion of items, for example fire wood, a shovel attachment 70 is provided for fitting onto tines 52, 54 of fork 28. By way of example, shovel attachment 70 could be employed to shovel ashes from a kiln or stove or campfire. Although shovel attachment 70 may take other forms, as shown in FIG. 7, it is preferably of one-piece construction, providing folds 72, 74 for receiving the ends of tines 52, 54, respectively, and providing bends 76, 78 to increase the carrying capacity of shovel 70. Thus, shovel 70 is selectively placed on or removed from fork 28, depending on the desired use for device 10.

Realizing further that device 10 may be provided as part of a campfire or fireplace kit, and that it might be desirable to manipulate firewood without actually requiring that the firewood be grasped, as by clamping tine 34 and fork 28, a straight poker is provided as part of such a kit, and identified by the numeral 100 in FIG. 8. Straight poker 100 is substantially identical to support staff 12, but does not contain a grip 26 or the elements that connected support staff 12 to handle lever 40, linkage 36, clamp lever 29, and clamping tine 34. Substantially similar elements have been designated as in device 10, but have been increased by 100. As the identification "straight" poker 100 implies, fork 128 of straight poker 100 does not extend at an angle from fore end 114 of straight poker 100. Notably, utilitarian advantages of straight poker 100 are realized by providing fork 128 having tines 152, 154, and steps 156, 158, because, for example, a log could be turned over by placing one tine (e.g., tine 152) under a piece of fire wood and placing another tine (e.g., tine 154) on top of a piece of firewood and thereafter simply twisting straight poker 100 to rotate the piece of firewood. Shovel attachment 70 is also adapted to fit onto straight poker 100 identically as it fits on fork 28 of device 10.

In light of the foregoing, it should thus be evident that the process of the present invention, providing a device for manipulation of items, substantially improves the art. While, in accordance with the patent statutes, only the preferred embodiments of the present invention have been described in detail hereinabove, the present invention is not to be limited thereto or thereby. Rather, the scope of the invention shall include all modifications and variations that fall within the scope of the attached claims.

What is claimed is:

1. A device for the remote manipulation of items comprising:
   a support staff having a fore end and an aft end and including a handle at said aft end, a handle fulcrum proximate said aft end, a clamp fulcrum proximate said fore end, and a grip positioned between said handle fulcrum and said clamp fulcrum;
   a fork extending from said fore end of said support staff;
   a handle lever pivotally connected to said handle fulcrum and pivotal between an open position and a closed position;
   a clamp lever pivotally connected to said clamp fulcrum;
   a clamping tine extending from said clamp lever to be pivotal therewith between an open position and a closed position in relation to said fork; and
   a linkage extending between said handle lever and said clamp lever such that, when said handle lever is pivoted to its said open position, said clamp lever is pivoted to place said clamping tine in its said open position in relation to said fork, and, when said handle lever is pivoted to its said closed position, said clamp lever is pivoted to place said clamping tine in its said closed position in relation to said fork.

2. The device for the remote manipulation of items according to claim 1, wherein said handle lever is generally L-shaped, having a major extension and minor extension, and is connected to said handle fulcrum at the junction of said major extension and said minor extension, said linkage extending from the end of said minor extension that is distal from the connection point of said handle fulcrum.

3. The device for the remote manipulation of items according to claim 1, wherein said fork extends at an angle from said fore end of said support staff.

4. The device for the remote manipulation of items according to claim 1, wherein said fork includes a first tine and a second tine that are staged to provide alternate widths between said first and second tines, said first and second tines being closer together proximate said fore end of said support staff and being staged further apart at a position distal from said fore end of said support staff.

5. The device for the remote manipulation of items according to claim 4, wherein said clamping tine is aligned between said first and second tines of said fork.

6. The device for the remote manipulation of items according to claim 1, wherein said clamping tine is hooked toward said fork.

7. The device for the remote manipulation of items according to claim 6, wherein said first and second tines of said fork are hooked toward said clamping tine.

8. The device for the remote manipulation of items according to claim 1, further comprising a removable shovel attachment configured to be received over said first and second tines of said fork.

9. The device for the remote manipulation of items according to claim 1, wherein said fork includes a first tine and a second tine, in said open position, said clamping tine and said first and second tines of said fork provide a tripod support for the device to be free standing.

10. The device for the remote manipulation of items according to claim 1, wherein said fork includes a first tine and a second tine, in said closed position, said clamping tine and said first and second tines of said fork provide a tripod support for the device to be free standing.

11. The device for the remote manipulation of items according to claim 1, wherein said clamp lever includes a linkage end to which said linkage is pivotally attached and a tine end to which said clamping tine is affixed, said clamp lever being pivotally attached to said clamp fulcrum between said linkage end and said tine end.

12. The device for the remote manipulation of items according to claim 1, further comprising a shovel attachment capable of selective engagement with said fork.

13. A kit for the remote manipulation of items comprising:

a clamping device comprising:
- a support staff having a fore end and an aft end and including a handle at said aft end, a handle fulcrum proximate said aft end, a clamp fulcrum proximate said fore end, and a grip positioned between said handle fulcrum and said clamp fulcrum;
- a fork extending from said fore end of said support staff fulcrum;
- a handle lever pivotally connected to said handle fulcrum and pivotal between an open position and a closed position;
- a clamp lever pivotally connected to said clamp fulcrum;
- a clamping tine extending from said clamp lever to be pivotal therewith between an open position and a closed position in relation to said fork; and
- a linkage extending between said handle lever and said clamp lever such that, when said handle lever is pivoted to its said open position, said clamp lever is pivoted to place said clamping tine in its said open position in relation to said fork, and, when said handle lever is pivoted to its said closed position, said clamp lever is pivoted to place said clamping tine in its said closed position in relation to said fork;

a straight poker, separate from said clamping device, comprising a staff having a fork extending therefrom; and a shovel attachment capable of being selectively received on said fork of said clamping device or said fork of said straight poker.

* * * * *